April 27, 1954
C. J. SMITH
2,676,663
POWER STEERING DEVICE
Filed Sept. 27, 1952
4 Sheets-Sheet 1
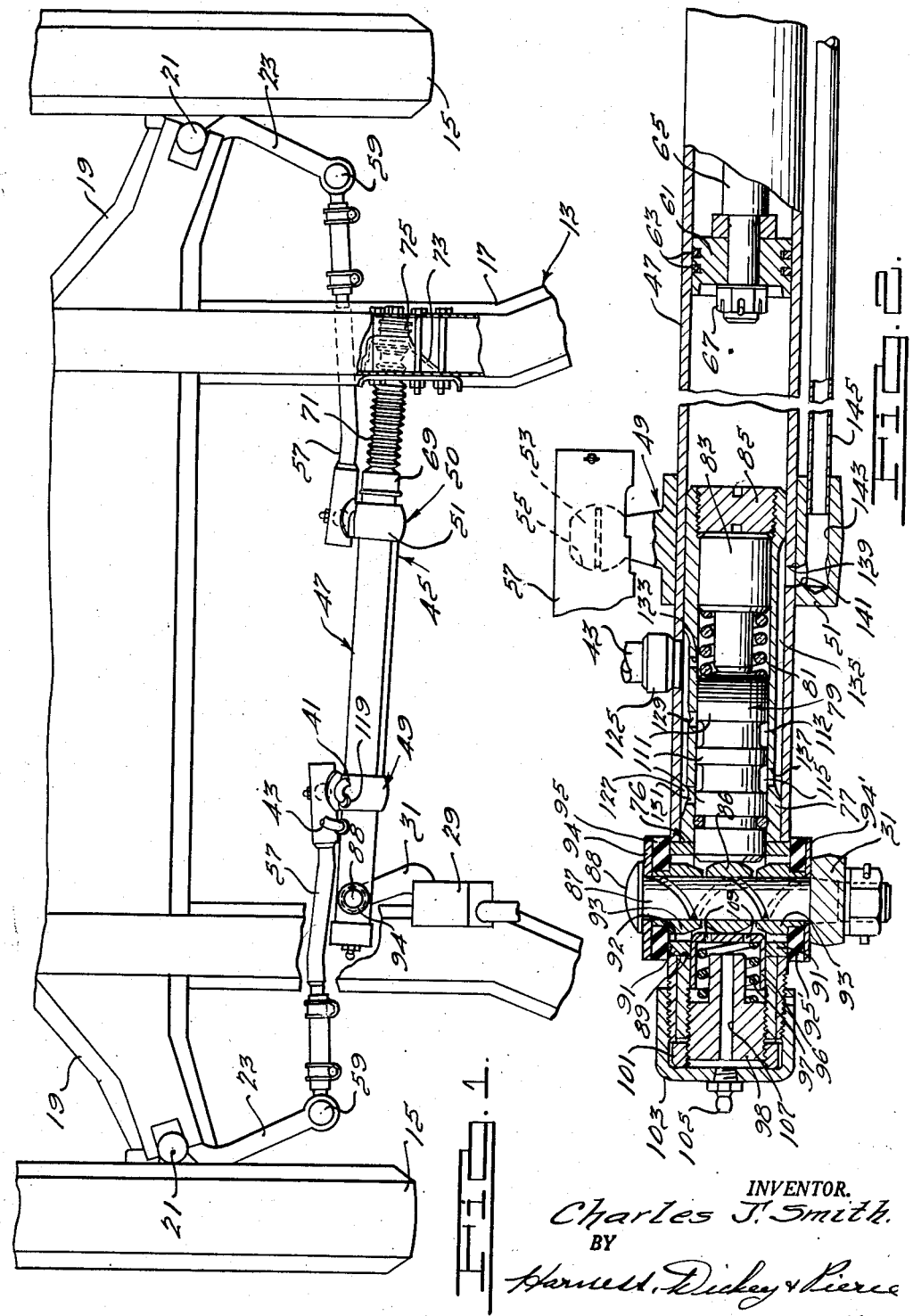
INVENTOR.
Charles J. Smith.
BY
Harness, Dickey & Pierce
ATTORNEYS.

April 27, 1954   C. J. SMITH   2,676,663
POWER STEERING DEVICE
Filed Sept. 27, 1952   4 Sheets-Sheet 2

INVENTOR.
Charles J. Smith.
BY
Harness, Dickey & Pierce
ATTORNEYS.

April 27, 1954 C. J. SMITH 2,676,663
POWER STEERING DEVICE
Filed Sept. 27, 1952 4 Sheets-Sheet 3
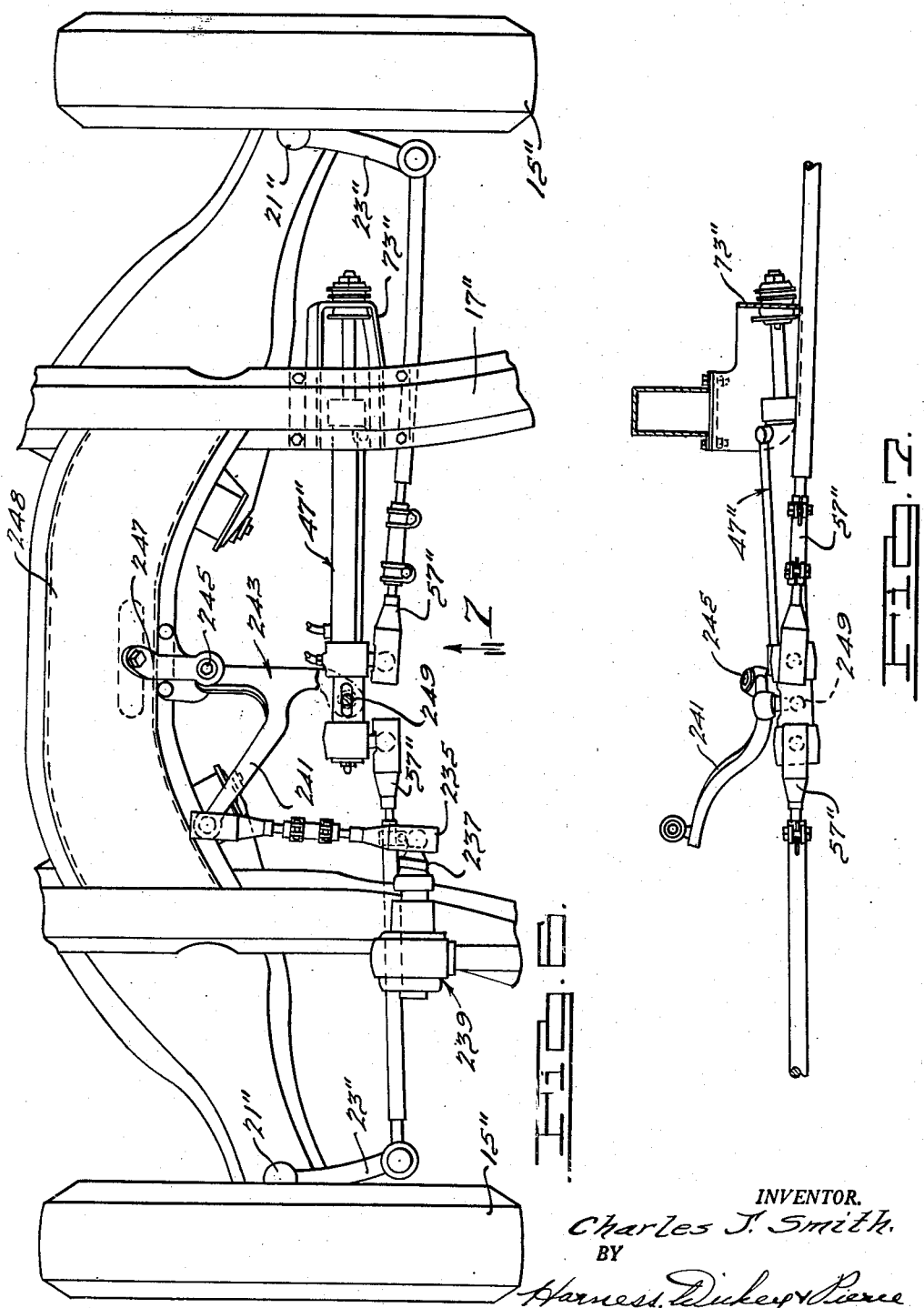
INVENTOR.
Charles J. Smith.
BY
Harness, Dickey & Pierce
ATTORNEYS.

April 27, 1954
C. J. SMITH
2,676,663
POWER STEERING DEVICE
Filed Sept. 27, 1952
4 Sheets-Sheet 4
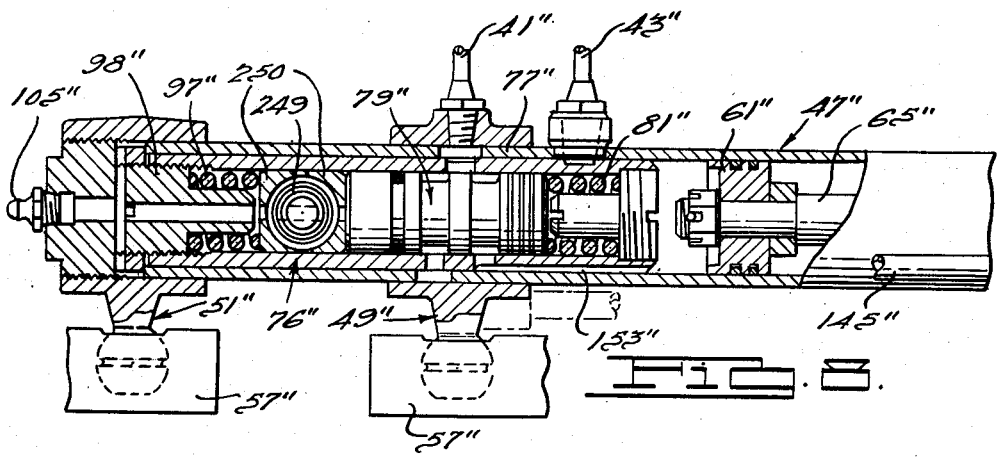
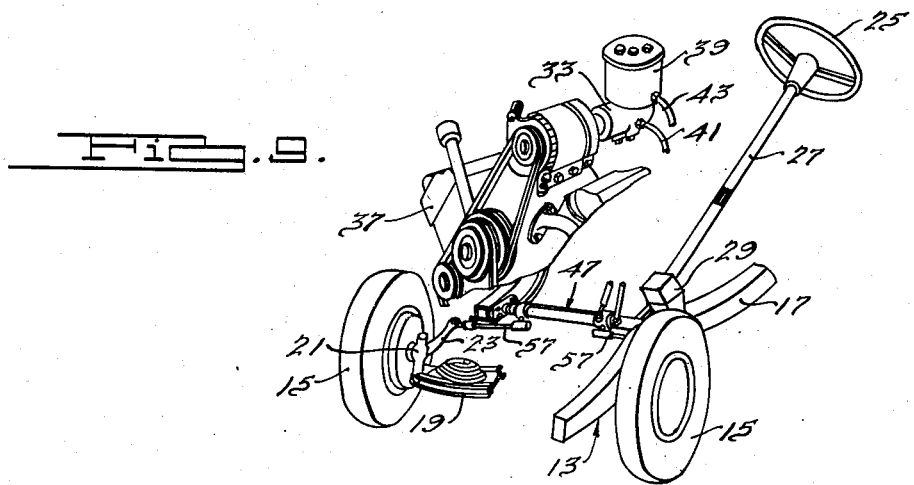
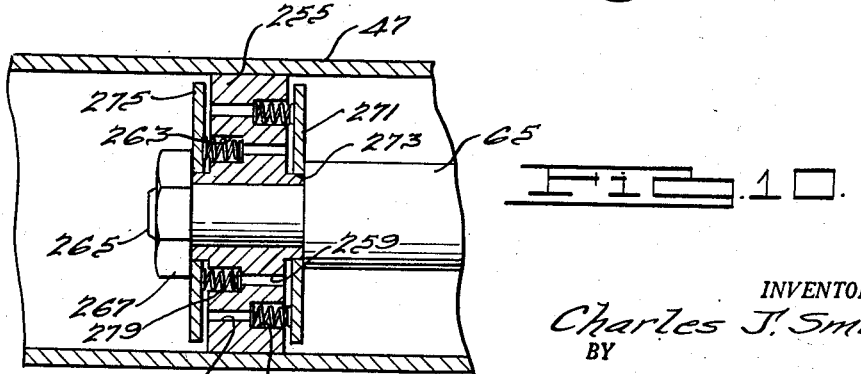
INVENTOR.
Charles J. Smith.
BY
Harness, Dickey & Pierce
ATTORNEYS.

Patented Apr. 27, 1954

2,676,663

UNITED STATES PATENT OFFICE 2,676,663

POWER STEERING DEVICE

Charles J. Smith, Monroe, Mich., assignor to Monroe Auto Equipment Company, Monroe, Mich., a corporation of Michigan Application September 27, 1952, Serial No. 311,898

7 Claims. (Cl. 180—79.2)

This invention relates generally to vehicle power steering devices and more particularly to an improved hydraulic power steering unit connectible between the steering or pitman arm of a vehicle steering gear assembly and steering linkage for the vehicle ground engaging wheels.

While many power steering units for vehicles, and particularly for automobiles, have been devised, the majority of such units have been relatively complicated and expensive to manufacture, have been difficult to maintain in proper operating condition, have not always provided for manual steering in the event the power steering unit should fail in operation, have been excessively noisy in operation and have not maintained for the operator, through the steering system, a certain amount of "road feel," while at the same time enabling the vehicle to be easily steered whether parked or moving.

It is therefore an object of this invention to provide a power steering device which may eliminate a portion of the normal vehicle manual steering mechanism or linkage, thereby reducing the cost of the complete steering mechanism, and which at the same time insures the obtainance of manual steering in the event that the power unit should fail.

It is a still further object of this invention to provide a power steering unit in which the amount of steering force exerted by the vehicle operator through the steering wheel can be maintained at any desired amount so that any amount of "road feel" may be present in the steering mechanism in accordance with the desires of the vehicle designer or manufacturer.

It is a still further object of this invention to provide a novel combination hydraulic operating valve and piston and cylinder unit which is connectable between vehicle ground engaging wheel steering linkage and the steering arm of a vehicle steering gear assembly to effect power steering in a more efficient, inexpensive and satisfactory manner than has been heretofore known.

It is a still further object of this invention to provide an improved unit of the aforementioned type in which the use of outside conduits for connecting the operating valve with the piston and cylinder unit is materially reduced or eliminated.

It is a still further object of this invention to provide an improved operating valve structure for the power steering piston and cylinder unit, which is more simple in construction and efficient in operation than any heretofore known, and in which the movable valve element is connected to the steering arm of the vehicle steering gear assembly.

It is a still further object of this invention to provide in a power steering device of the aforementioned type, a novel valve piston and cylinder unit in which the piston is anchored to the vehicle frame and the cylinder is movable under fluid pressure relative to the piston and carries connector elements connectable with the ground engaging wheel linkage.

It is a still further object of this invention to provide a novel piston construction for a power steering device piston and cylinder unit, which is constructed to facilitate the more rapid return of the piston to its normal centered position after the vehicle steering wheel and the power steering device valve element has been actuated to turn the vehicle.

It is a still further object of this invention to provide a power steering device of the aforementioned type, which can be used with various steering mechanism arrangements.

It is a still further object of this invention to provide improved structure for operatively connecting the valve spool of the power steering operating valve with the vehicle steering system pitman arm so that positive and proper actuation of the valve spool will occur under all conditions upon actuation of the pitman arm, without any danger of the valve binding or locking up.

It is a still further object of this invention to provide a power steering device which is superior to devices heretofore made, used, or known.

These and other objects of this invention will become apparent from the following detailed description, taken in conjunction with the accompanying drawings, in which:

Figure 1 is a fragmentary top elevational view of the power steering device of this invention, connected with the steering gear assembly and vehicle ground engaging wheels;

Fig. 2 is a fragmentary longitudinal sectional view of the valve, piston and cylinder unit illustrated in Fig. 1;

Fig. 6 is a top plan view similar to Fig. 1, illustrating the power steering device connected with a different type of vehicle steering mechanism or arrangement;

Fig. 7 is a rear elevational view of the structure illustrated in Fig. 6, taken in the direction of the arrow 7 thereon;

Fig. 8 is a fragmentary longitudinal sectional view of the valve, piston and cylinder unit of the power steering device illustrated in Figs. 6 and 7;

Fig. 9 is a schematic view showing the power steering device on a vehicle and connected with a fluid pump and reservoir; and Fig. 10 is a longitudinal sectional view of a portion of a power steering device cylinder with a further embodiment of a piston illustrated therein.

Figure 3:
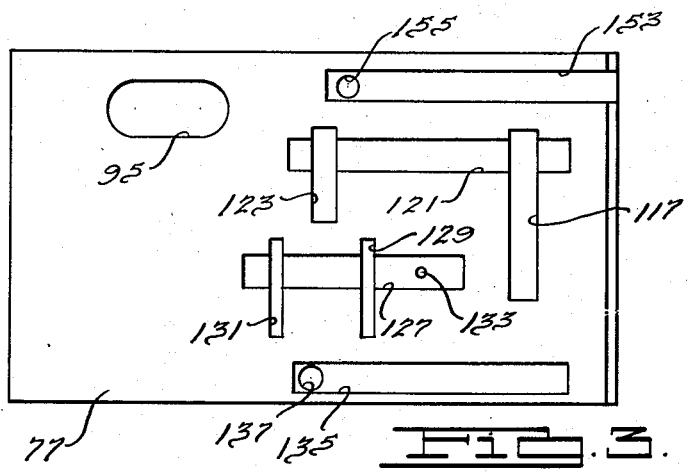
Fig. 3 is a flat development of the sleeve of the valve illustrated in Fig. 2.

Referring now to the drawings and more particularly to Figs. 1-3 and 9, it will be seen that a vehicle such as an automobile 13 is illustrated, which includes front ground engaging wheels 15, which are supported on a vehicle frame 17 through suitable suspension arms or the like, 19. A steering knuckle 21 is carried by the suspension arms 19 on each side of the car to permit the wheels to turn about a generally vertical axis, and connected with the steering knuckles 21 in a conventional manner are steering knuckle links 23 which extend angularly rearwardly therefrom. The vehicle also includes a conventional steering wheel 25 which is connected through a steering shaft 27 with a steering gear assembly 29. The steering gear assembly may be of any suitable type which includes a steering or pitman arm 31. In the particular steering mechanism illustrated, the steering arm 31 projects forwardly from the steering gear and when the steering wheel is actuated the free end of the steering arm is caused to move laterally relative to the vehicle frame in a conventional manner.

In order to provide a power steering device for an automotive vehicle, a suitable power source must be provided. As the power steering unit of this invention is of the hydraulic type, the power source consists of a pump connected with the vehicle power plant in any suitable manner. Fig. 9 illustrates a pump 33 connected with the vehicle engine 37. The pump 33 has connected therewith a reservoir 39, and a pressure conduit 41 is connected with the pump and with the power steering device, as will hereinafter appear, and a sump conduit 43 is connected with the reservoir and with the power steering device, as will hereinafter appear. The pump may be of any suitable type but should be of a type which will produce sufficient pressure to aid in the operation of the vehicle steering even when the engine is idling.

As can be best seen in Figs. 1-3 the power steering device is indicated generally at 45 and includes a laterally extending tubular or cylinder member 47. Connected with the cylinder member 47 at laterally spaced points are connector elements 49 and 50, each of which includes a bosslike portion 51 extending around the cylindrical member 47 and a ball headed portion 53 projecting upwardly from the cylinder member 47. The ball headed portion 53 of each of the connector elements 49 and 50 is received in a spherical socket 55 in the inner end of a link member 57. The outer ends of each of the link members 57 are pivotally connected at 59 to the knuckle links 23 so that when the cylinder member 47, and the connector elements carried thereby, are moved laterally of the vehicle frame 17, the links 57 and 23 connected with each of the wheels 15 will cause the wheels to turn in accordance with the direction of movement of the cylinder 47.

A bore fitting piston 61 is disposed within the cylinder and includes suitable rings 63 to provide a sealing fit between the piston and cylinder. A piston rod 65 is connected with the piston by any suitable means, such as nut 67, and has its opposite end projecting through a rod guide and closure member 69 at one end, the right hand end as viewed in Figs. 1 and 2, of the cylinder 47. The exposed portion of the piston rod 65 is shown as being enclosed in a rubber bellows-like protector member 71 and the free end of the piston rod is anchored to the adjacent longitudinal frame member by means of a suitable bracket 73 and connector elements 75. The connector elements may be of any suitable type but are illustrated as being of the type which includes rubber cushionlike members which, while anchoring the free end of the rod, will cushion the same against breakage due to vehicle vibrations or the like. The cushionlike members also allow small angular movement of the piston rod which occurs when the vehicle wheels are turned. It will thus be seen that the piston rod is anchored to the vehicle frame but the cylinder is movable relative to the piston. An operating valve 76 which includes a sleeve member 77 is disposed in the opposite end of the cylinder 47 from the piston and rod. The sleeve member 77 is preferably shrink or press fitted into the cylinder member 47 and has a valve spool 79 slidably disposed therein. The inner end of the spool valve 79 abuts a coil spring 81, which in turn is sleeved over and has its opposite end engaging an abutment member 83, which is disposed within the sleeve 77. A plug 85 is threadably connected in the inner end of the sleeve 77 and engages the abutment member 83 so as to load the spring 81 against the inner end of the spool valve.

The outer end of the valve spool engages a spherical or ball member 86, which is sleeved on a pin or stud member 87. The lower end of the pin or stud member is connected by any suitable means to the pitman arm 31. The pin member 87 extends vertically through the cylinder 47 and sleeve member 77 and the upper headed end 88 thereof is exteriorly disposed on the opposite side of the cylinder. The cylinder and sleeve are provided with opposed elongated and aligned openings 89, in which, in the illustrated embodiment, hardened steel inserts 91 are fitted. Each of the inserts 91 is provided with an elongated slot or opening 92 which receives a slide or shoe member 93. The members 93 are sleeved on the pin 87 adjacent the opposite ends thereof. Disposed between the headed end 88 of the pin member 87 and the outer wall of the cylinder 47 is a washer element 94 and a resilient or rubber washer 95. A similar washer 94' and rubber washer 95' are provided between the pitman arm 31 and the cylinder wall. Each shoe member 93 abuts its adjacent rubber washer 95 or 95'. When the pin member 87 is connected to the pitman arm 31 the rubber washers 95 and 95' engage the opposite sides of the cylinder outer wall so that the rubber washers act to prevent the ingress of dirt into the cylinder, act as spacers, and provide a cushion between the pin 87 and the cylinder. When the pitman arm 31 is actuated the pin member 87 can move axially of the cylinder and its movement is guided by the shoes or slides 92 which are in slidable engagement with the inserts 91. The spherical member 86 can move vertically on the pin member 87 between the slides 93 to assure proper engagement with the end of the valve spool at with an opening 141 in the boss portion 51 of the connector element 49. The opening 141 in turn communicates with a laterally extending passageway 143 in the boss portion 51 and a conduit 145 is connected in the passageway of the boss portion 51 so that liquid flowing through the sleeve opening 137 and groove 135 will flow through openings 139 and 141 and passageway 143 to conduit 145. The opposite end of the conduit 145 communicates with the opposite end of the cylinder 47 on the piston rod side of the piston 61. That is, the conduit 145 extends from the connector element 49 laterally in close proximity to the cylinder 47 and the opposite end thereof extends into the boss portion of the connector element 50 to communicate through openings (not shown) with the interior of the cylinder. The sleeve 77 is provided with a still further longitudinally extending groove 153 which is angularly spaced relative to the grooves 121, 127 and 135. The groove 153 extends from a point intermediate the longitudinal ends of the sleeve 77 to the inner end of the sleeve so that the inner end of the groove 153 communicates with the interior of the cylinder 47 between piston 61 and sleeve plug 85. The sleeve is provided with an aperture 155 adjacent the opposite end of the groove 153 which communicates the groove 153 with the interior of the sleeve.

It will, of course, be appreciated that the springs 81 and 97 normally retain the spool 79 in its neutral position. After the vehicle ground engaging wheels have turned, it is desirable that the steering system properly and speedily recover. That is, it is desirable that the steering mechanism not impede the normal forces acting on the ground engaging wheels to cause the same to straighten out. Therefore, when the vehicle is turned the desired amount in either direction, and additional turning force is not applied through the steering wheel, the springs 81 and 97 will return the spool 79, which has been shifted as a result of movement of the steering arm 31, to its neutral position. Thereafter the wheels will tend, because of the normal forces acting thereon, to straighten out, and the hydraulic power steering device will not appreciably interfere with this action.

For this reason, in the structure of this device, when the spool is in its neutral position, the interior of the cylinder 47 on both sides of the piston 61 will be open to the reservoir 39 through the reservoir conduit 43. While hydraulic fluid will flow from the pump through the pressure conduit 41 and through the sleeve slot 123, thence outwardly through both sleeve openings 137 and 155 to the cylinder 47 on opposite sides of the piston 61, the fluid will flow through the sleeve slots 131 and 129 back to the reservoir 39 through the sump conduit 43. That is, while fluid under pressure flows to both sides of the cylinder, the spool grooves 113 and 115 will be open to permit the fluid to return to the sump. It will, of course, be appreciated that the sleeve openings 137 and 155 will only be slightly opened to the flow of fluid under pressure to the cylinder, but the flow of fluid is desirable to reduce the pump work and pump operating pressures and to keep the cylinder filled with fluid at all times so that no voids or air pockets will be present in the cylinder during the power steering operation. The pressure in the opposite ends of the cylinder, when the spool is in its neutral position, is relatively low and perhaps in the vicinity of around twenty-five pounds. The amount of opening of the sump slots 129 and 131 to the opposite sides of the cylinder and of the pressure slot 123 will, of course, vary depending upon the steering mechanism of the particular vehicle on which the device is mounted and on the amount of recovery desired or necessary in a particular vehicle. It will, however, be appreciated that after the wheels have been turned, the cylinder 47 must return to its neutral position when the wheels straighten out. In order for the cylinder 47 to so move, the fluid must be able to flow from one side or the other of the cylinder to permit the cylinder to move relative to the piston. If the fluid cannot properly flow from the cylinder, then the cylinder could not return to its neutral position.

Furthermore, the amount of opening of the sump slots 129 and 131 to the opposite sides of the cylinder 47, as well as the opening of the pressure slot to the opposite sides of the cylinder, can be varied depending upon the circumferential extent of the slot. That is, if the slots are of a relatively long circumferential extent, then a smaller linear opening of the sleeve slots to the spool slots will permit the same amount of fluid to flow to or from the opposite ends of the cylinder. If the slots are of a shorter circumferential extent, then, of course, the linear dimensional opening must be greater to handle the same flow of fluid. In addition, the flow of fluid to the opposite sides of the cylinder, to maintain the cylinder in a balanced condition relative to the piston, will be different because of the volume occupied by the piston rod 65 in the outer end portion of the cylinder. Thus, a lesser volume of fluid will flow to the outer end of the cylinder than to the inner end, in order to maintain a balanced condition. In one particular automotive vehicle on which this power steering device was mounted, it was found that if the pressure slot 123 were of approximately 90° in circumferential extent, while the sump or reservoir slots 129 and 131 were of approximately 120° in circumferential extent, satisfactory results were achieved with an opening of .001" on the left hand side of the slot 123 to the outer end of the cylinder 47 and an opening of .0015" on the opposite side of the slot 123 leading to the inner end of the cylinder 47, when the spool was in its neutral position. Likewise, an opening of .019" on the sump slot 129 leading to the inner end of the cylinder 47 and an opening of .012" on the sump slot 131 leading to the outer end of the cylinder was satisfactory when the spool was in its neutral position. With these openings, satisfactory steering recovery was obtained, while at the same time the power steering responded satisfactorily to the movement of the steering wheel to provide power steering in an efficient, desired manner. It will also be understood that by using slots having a relatively long circumferential extent and relatively narrow linear dimension, faster power steering will be obtained because the spool travel is less and the flow of fluid is more quickly controlled and affected.

It will furthermore be appreciated that under most circumstances the sump slots 129 and 131 will still communicate with both sides of the cylinder even after the spool valve has been shifted at least a predetermined amount. This, of course, results from the fact that in order to obtain sufficient sump openings when the valve is in its neutral position, there must be at least somewhat of a sump opening when the valve is shifted a predetermined amount in either direction. The amount of the sump openings, as pointed out all times, and as any angular or deflection forces or loads will be taken by the cylinder, there will be no tendency for such loads to be taken by the valve spool, which might tend to cause the spool to bind within the sleeve member 77. It will likewise be noted from the drawing that the slides or shoes 93 are sleeved on the pin 87 and engage the periphery of the pin, at the opposite ends thereof, over a portion of the pin length so as to provide substantial bearing area therebetween. As the slides engage the hardened inserts 91, which are connected with the cylinder, they cooperate with the pin to prevent any substantial rotation of the cylinder about its longitudinal axis but are interconnected with the pin and cylinder to permit movement of the cylinder in other directions. Thus, this structure prevents cylinder rotation as well as binding between the pin and cylinder and between the pin and the valve spool, and is extremely important in independent suspension type vehicles where at times strong forces occur which tend to rotate the cylinder or drag links. Obviously, if the cylinder were permitted to rotate the mechanism would bind and be inoperative. While other arrangements might be employed between the cylinder and pin to accomplish this result, it is essential that any substantial rotation of the cylinder be prevented, without causing binding of the unit. Suitable lubricating passages may be provided in the pin member for carrying lubricant to the spherical member and the slide members to insure easy operation at all times.

A slidable cagelike member 96 is disposed in the cylinder on the opposite side of the spherical member 86 from the valve spool, and a coil spring 97 urges the cage member 96 into engagement with the spherical member 86 and thus acts against the opposite end of the valve spool from the spring 81. The coil spring 97 is held in place by an abutment member 98, which is threaded into the outer end of the sleeve 77. It will, of course, be appreciated that if desired, the end of the cylinder through which the pin member 87 projects could be made separately from the remainder of the cylinder and connected therewith by any suitable means. With this latter arrangement, prior to cylinder assembly the separate cylinder portion could be hardened so that the slide or shoe members 93 could be supported directly in cylinder openings, thus eliminating the necessity of the inserts 91. In any event, a satisfactory connector arrangement is provided between the pitman arm 31 and the valve spool, so that the pitman arm is operatively connected with the valve spool and will always be properly actuated by movement of the pitman arm without any danger of spool binding occurring, even if the cylinder and sleeve openings 89 are slightly out of alignment and irrespective of the angular position of the cylinder relative to the pitman arm and connector. A lock nut 101 is threaded onto the outer end of the abutment member 98 and engages the ends of the sleeve and cylinder members to releasably lock the abutment member in its adjusted threaded position. A cap member 103 is threadably connected to and encloses the end of the cylinder member 47 and carries a grease fitting 105 which is disposed in alignment with an aperture 107 in the abutment member 99 and apertures 109 are provided in the cage member 96 to permit proper lubrication of the connector. It will thus be seen that the spool valve and connector element are located and held in their proper position relative to the sleeve by the coil springs 81 and 97, and it will furthermore be appreciated, and will be hereinafter brought out, that the spool valve 79 cannot move in either direction relative to the sleeve 77 until the force exerted by the springs is overcome.

The valve spool 79 includes three laterally spaced bore-fitting lands 111, which slidably engage the inner wall of the sleeve 77 and which provide therebetween circumferential grooves 113 and 115. The sleeve 77, as can be best seen in Figs. 2 and 3, is provided with a plurality of apertures, grooves and slots which are adapted to communicate with the spool grooves to direct the flow of hydraulic fluid from the fluid pump to the cylinder on one side or the other of the piston 61 and from the opposite side of the cylinder back to the fluid pump reservoir. The sleeve 77 is provided with a groove 117 extending circumferentially around a portion of the sleeve periphery adjacent the right hand end of the sleeve and in alignment with an opening in the cylinder 47, in which a fitting 119 on one end of the pressure conduit 41 from the pump 33 is connected. The groove 117 communicates with a longitudinally extending groove 121 in the outer periphery of the sleeve, which in turn communicates with a slot 123 extending circumferentially around a portion of the sleeve in longitudinally spaced relationship to the groove 117. Fluid under pressure from the pump therefore flows through conduit 41 and the fitting 119 in the cylinder wall to groove 117 in the sleeve wall, thence along longitudinal groove 121 and through slot 123 into the interior of the sleeve. The grooves 117 and 121 are provided merely to communicate slot 123 with the pressure conduit fitting 119, in view of the fact that when this device was mounted on a particular vehicle, there was not sufficient clearance with respect to other vehicle parts to connect the pressure conduit to the cylinder 47 in direct alignment with slot 123. However, if there is sufficient clearance in a vehicle, the grooves 117 and 121 might not be needed and slot 123 could be communicated directly with the pressure conduit.

The sump conduit 43 is connected in an opening in the wall of cylinder 47 by a fitting 125 and the sleeve 77 is provided with a longitudinally extending groove 127 in the outer periphery thereof, one end of which is disposed in alignment with the fitting 125. A slot 129 is cut in the wall of the sleeve and extends circumferentially around a portion thereof, while a second slot 131 is similarly cut in the wall of the sleeve outwardly of the slot 129. It will be noted from Fig. 3 that the slot 129 is disposed longitudinally inwardly of slot 123, while slot 131 is disposed longitudinally outwardly of slot 123. A drain hole 133 is provided in the wall of the sleeve 77 which communicates with the interior of the sleeve 77 inwardly of the inner end of spool valve 79 so that in the event any hydraulic fluid should leak past the spool valve, a pressure of fluid cannot build up between the spool valve and the abutment member 83, but the fluid can return to the reservoir through the hole 133.

The sleeve 77 is provided with a longitudinally extending groove 135 in the periphery thereof, which is angularly spaced relative to grooves 121 and 127. The sleeve is provided with an aperture 137 adjacent the outer end of the groove 135, which communicates the groove with the interior of the sleeve. The inner end of the groove 135 communicates with an opening 139 in the wall of the cylinder 47 adjacent the inner end of the sleeve 77. The opening 139 in turn communicates previously depends upon the vehicle steering mechanism, the vehicle itself, and the amount of recovery desired in the steering mechanism, but it is thought that with this arrangement proper recovery is obtained without detrimentally affecting the power steering action. Furthermore, with the arrangement illustrated, the steering mechanism has fewer friction points than in any known booster type power steering mechanism so that steering recovery is still further aided and assured.

When it is desired to turn the vehicle and thus the vehicle wheels 15 to the right, the steering wheel 25 is turned to the right, which causes the steering arm 31 to move to the left. The movement of the steering arm 31 to the left will cause movement of the cylinder 47 and thus the connector elements 53 and the wheel links to move to the left, thus turning the wheels in a direction to cause the vehicle to move to the right. The movement of the steering arm 31 will not cause relative movement between the valve spool 79 and the cylinder 47 until a sufficient force has been exerted by the operator of the vehicle to overcome the force exerted by the springs 81 and 97. Th springs 81 and 97 may be calibrated to exert any predetermined force of between substantially zero and the number of pounds required in a manual steering arrangement, in accordance with the desires of the motor vehicle manufacturer and the amount of road feel it desires in its power steering mechanism. In at least one instance a force of approximately four to five pounds was employed. If the springs 81 and 97 exert practically no force, then, of course, the valve spool 79 will move to the left almost instantaneously with movement of the steering arm 31. In any event, upon overcoming the force exerted by springs 81 and 97, so that movement of the valve spool occurs, the fluid under pressure will flow from the pump through the grooves in sleeve 77 as previously described, through slot 123 into the interior of the sleeve thence through the spool groove 113, through sleeve aperture 155, and sleeve groove 153, into the cylinder between the piston 61 and the sleeve plug 85 to aid in moving the cylinder to the left. The fluid in the cylinder on the opposite side of the piston will flow therefrom through conduit 145 to the passageways and openings in the connector element 49 and cylinder 47, through sleeve groove 135, aperture 137, spool groove 115, thence through the sleeve slot 131 and groove 127 to the sump conduit 125 and back to the reservoir 39. Upon actuation of the spool valve in the opposite direction, the fluid from the pump will flow through the sleeve slot 123, spool groove 115, through the sleeve aperture 137 and slot 135, thence through the openings in the cylinder and connector element to conduit 145 and to the outer end of the cylinder. Similarly, the fluid in the inner end of the cylinder will flow therefrom through the sleeve groove 153 and aperture 155 through the spool groove 113 and sleeve slot 129 and groove 127, thence to the sump conduit.

In the conventional manual steering arrangement drag links are normally incorporated between the pitman arm and the links 57. Therefore, it will be seen that the piston cylinder and valve unit replaces the drag links, thus effecting a saving for the vehicle manufacturer in the elimination of parts of the manual steering arrangement. At the same time, however, it will be appreciated that if the power steering should fail, the vehicle may still be manually steered in the ordinary manner, due to the fact that the steering arm 31 can move the cylinder 47 and due to the fact that the cylinder 47 is connected to the wheel links 57 while the piston rod 65 is anchored to the vehicle frame. Thus the power steering device illustrated in Figs. 1–3, due to the use of the described cylinder member containing the piston and operating valve, is relatively inexpensive to manufacture, extremely simple in construction, and eliminates or minimizes the use of outside conduits between the valve and cylinder.

Figure 4:
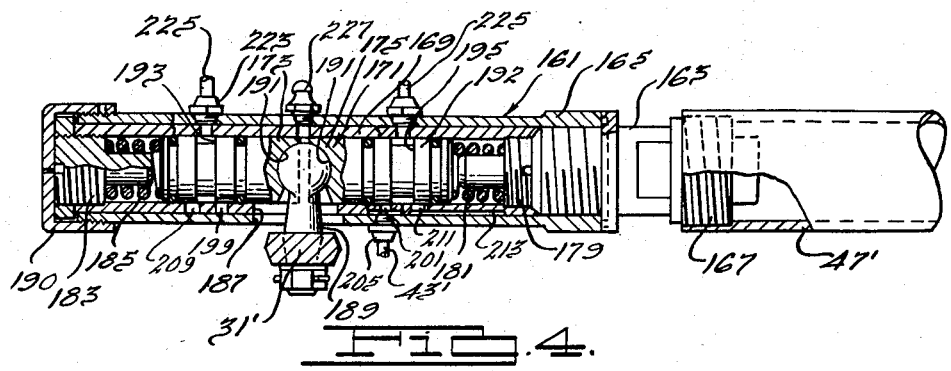
Fig. 4 is a sectional view similar to Fig. 2, illustrating a further embodiment of the invention.
Figure 5:
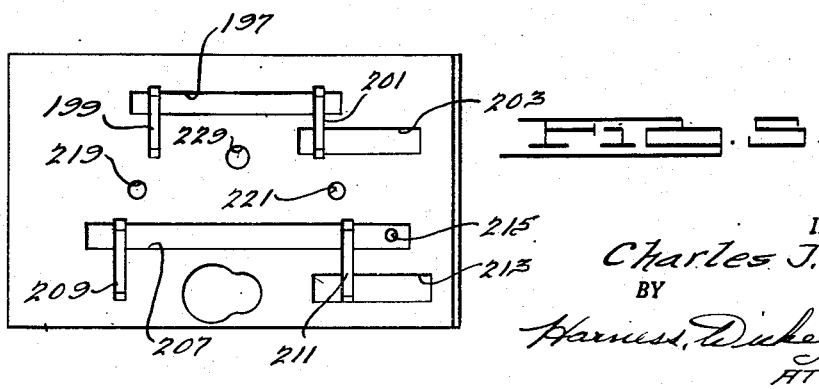
Fig. 5 is a flat development of the sleeve of the valve illustrated in Fig. 4.

In the embodiment illustrated in Figs. 4 and 5 the operating valve assembly 161 is threadably connected in one end of the cylinder 47' by means of a connector 163 which is threaded into one end of a tubular valve housing 165 and the opposite end of which is welded to the cylinder 47', and a plug 167 closes the adjacent end of the cylinder. A sleeve 169 is disposed in the housing 165 and a spool valve generally indicated at 171 is slidably disposed in the sleeve 169. The spool valve is separated into two sections 173 and 175. A plug 179 is threaded into the right hand or inner end of the sleeve 169 and a coil spring 181 abuts the plug and the adjacent end of the spool valve section 175. A plug 183 is threaded into the opposite end of the sleeve and spring 185 abuts the plug and the other spool valve section 173. The sleeve 169 and the housing 165 are provided with aligned apertures 187, through which the ball head of the stud member 189 may be inserted. The ball rests in complemental recesses 191 in the adjacent opposed faces of the spool sections 173 and 175 and is held therein by the action of the springs against the spool sections. A cap assembly 190 closes the outer end of the housing 165 in much the same manner as previously described. The spool valve 171 is provided with a plurality of longitudinally spaced lands 192 which define therebetween grooves 193 and 195. The sleeve 169 is formed with a longitudinally extending groove 197 communicating adjacent its opposite ends with circumferentially extending slots 199 and 201. Slot 201 communicates with a second longitudinally extending groove 203 in the sleeve, which groove communicates with a pump pressure conduit 43' connected to the housing 161 by a fitting 205. The outer wall of the sleeve 169 is provided with another longitudinally extending groove 207 which is angularly spaced from the grooves 197 and 203 and which has circumferentially extending slots 209 and 211 adjacent the opposite ends thereof. Slot 211 communicates with a further longitudinally extending groove 213 in the wall of the sleeve which communicates with a sump conduit connected to the fluid pump reservoir in any suitable manner. Groove 207, adjacent its inner or right hand end, is provided with a drain hole 215 which serves the same purpose as the drain hole 133 described in the previous embodiment. The sleeve is provided with longitudinally spaced apertures 219 and 221, each of which communicates with a fitting 223 connected to one end of a conduit 225. The opposite ends of the conduits 225 communicate with the interior of the cylinder 47' on opposite sides of a piston disposed therein, so that the valve can direct oil to and from the cylinder on opposite sides of the piston. If desired, an internal connection of sleeve aperture 221 with the adjacent end of cylinder 47' could be provided, by merely drilling or forming the necessary passageways. A grease fitting 227 is connected with the housing 165 and communicates through an opening in the sleeve with the interior thereof so as to permit the ball head of stud 189 to be lubricated. This valve operates in substantially the same manner as that previously described, in that when it is desired to turn the vehicle to the right, the steering arm 31' is turned in the usual manner, which causes the valve element, after overcoming the resistance of the springs, to move relative to the sleeve and housing. When it is desired to turn the vehicle to the right, the valve element is shifted so that fluid from the pump flowing into the valve will flow through the sleeve grooves 203, 201, 197 and 199 into the spool valve groove 193, thence through the opening 219 in conduit 225 to the piston rod side of the cylinder, while fluid in the near side of the cylinder will return to sump through the conduit 225, sleeve opening 221, spool valve groove 195 through the sleeve slot 211, groove 213, thence to the sump conduit. When it is desired to turn the vehicle in the opposite direction, the spool, of course, is moved in the opposite direction by the steering arm, so that a reverse flow of fluid occurs. It will thus be appreciated that the spool valve may be split into two sections if so desired, and the valve may be rigidly connected to the cylinder as a separate element, if so desired. It will likewise be appreciated that the sleeve of the operating valve may be grooved and ported in various manners to accomplish the desired flow of fluid to and from the pump into either end of the cylinder.

A different vehicle steering arrangement is illustrated in Figs. 6 and 7, although the power steering unit connected therewith is of the general type previously described. In Fig. 7, the ground engaging wheels 15" are supported on the vehicle frame in the manner previously described, and are turnable about steering knuckles 21" through the wheel links 23". A drag link 235 is connected at its back end to a movable element 237 of the steering gear assembly 239, which steering gear assembly is connected to a vehicle steering wheel in any suitable manner, such as previously described. The forward end of the drag link 235 is connected to one arm 241 of a bell crank member 243. The bell crank member is pivotally connected at 245 to a bracket 247, which in turn is connected with a vehicle cross frame member 248. Rearwardly of the pivotal connection 245, the bell crank is illustrated as carrying a ball headed member 249 which is connected with the spool valve of the power steering operating valve assembly, as will be hereinafter described, although it will be appreciated that the pin or stud type connector arrangement illustrated in Figs. 1 or 2 may be employed. Therefore, when the steering gear assembly is actuated by the steering wheel, the drag link 235 moves fore and aft, which causes the bell crank 243 to turn around the pivot 245 to swing the ball headed member 249 laterally of the vehicle, either to the right or left depending upon the direction of rotation of the steering wheel.

The power steering device illustrated in Figs. 6 and 7 is generally similar to that previously described, so that like double primed part numbers are used throughout. Connector elements 49" and 51" are carried by the cylinder 47" and in turn are connected with the steering links 57" for steering the vehicle ground engaging wheels. The piston rod 65", of piston 61", is connected by a suitable bracket 73" to the vehicle frame 17". The operating valve 76" is illustrated in Fig. 8 as carried in one end of the cylinder 47", as previously described, and includes the valve spool 79" connected with the ball headed member 249 by the connector elements 250, as previously described. The valve spool is spring loaded by springs 81" and 97" and upon actuation in one direction or the other directs the flow of fluid to the cylinder on opposite sides of the piston for actuating the cylinder and causing movement of the steering links, all as previously described. Various port and groove arrangements may be provided in the sleeve 77" for communicating the interior of the sleeve with the conduits 41" and 43" connected to the pump and reservoir, and to conduits 145" and 153" connected to opposite sides of the cylinder. Therefore it will be seen that the power steering device of this invention is usable with vehicle steering mechanisms of different types and arrangements, but in all cases provides a simple, inexpensive power steering unit connectable thereto in such a manner that if the power should fail, manual steering will always be maintained.

It has been found that in some installations of power steering units, in order to obtain speedy steering recovery after the vehicle has been turned, a special piston construction is desirable. Therefore, in Fig. 10 cylinder 47 is illustrated as having a piston 255 therein connected with the piston rod 65 in the manner previously described. The piston 255 is provided with a plurality of circumferentially spaced passages 257 and a second group of circumferentially spaced passages 259 disposed radially inwardly of the passages 257. The passages 257 are provided with recesses 261 extending inwardly from the right hand face of the piston as viewed in Fig. 10, while the passages 259 have similar recesses 263 extending inwardly from the opposite face of the piston. The piston rod 65 is provided with a reduced end portion 265, which extends through the central aperture in the piston and has a nut 267 threadably connected thereto. A disk 271 is disposed between the right hand face of the piston and the shoulder 273 on the piston rod, while a similar disk 275 is disposed between the nut 267 and the opposite face of the piston. Coil springs 279 are disposed in each of the recesses engaging the disks 273 and 275 tending to resiliently hold them outwardly away from the piston faces. However, when fluid under sufficient pressure is directed into either end of the cylinder, it will be sufficient to cause either of the disks to seat against the piston and prevent a flow of fluid through the piston. However, after the operating valve has been actuated and fluid under pressure is no longer supplied to one side or the other at a high pressure, the springs will hold the disks away from the piston faces and permit the fluid to flow directly from one side of the piston to the other to balance the pressure on opposite sides of the piston and permit speedy recovery of the steering mechanism. With the use of this piston construction, the operating valve sump openings can be smaller because they will only have to carry the volume occasioned as a result of piston rod displacement. If such a piston is not employed, then, of course, balance in the cylinder must be obtained by the flow of fluid back through the conduits and operating valve, which subsequently will balance the pressures on opposite sides of the piston in the cylinder.

What is claimed is:

1. In a vehicle power steering device, an elongated cylinder, a piston disposed within said cylinder, a piston rod connected with said piston and extending through one end of said cylinder, a sleeve disposed in the opposite end of said cylinder, means closing the opposite ends of said sleeve, a valve spool slidably disposed in said sleeve and including spaced lands having grooves therebetween, spring means disposed between said sleeve closing means and said spool for resiliently retaining said spool in a predetermined position in said sleeve, said sleeve having a first opening therein communicating with one of said spool grooves when said spool is in said predetermined position, said sleeve having a groove formed in the outer periphery thereof communicating with said first opening and with the portion of said cylinder between said sleeve and said piston to permit the flow of hydraulic fluid from said sleeve to said cylinder on one side of said piston, said sleeve having a second opening therein communicating with the other of said spool grooves when said spool is in said predetermined position, conduit means connecting said second opening with said cylinder on the piston rod side thereof, said sleeve having a circumferentially extending slot in the wall thereof between said first and second openings and communicating with both said openings through both of said spool grooves when said spool is in said predetermined position, said cylinder having an opening communicating with said slot and being connectible to a source of fluid under pressure, said sleeve having second and third spaced circumferentially extending slots therein disposed on opposite sides of said first slot, said sleeve having a groove therein communicating said second and third slots, said cylinder having an opening therein communicating with said second and third slots and connectible to a fluid sump or reservoir, said second slot communicating with said first opening through one of said spool grooves and said third slot communicating with said second opening through the other of said spool grooves when said spool is in said predetermined position.

2. A vehicle power steering device adapted to be connected between steering linkage for vehicle ground engaging wheels and the steering arm of a steering gear assembly, including a cylinder, a bore fitting piston disposed in one end of said cylinder, a piston rod connected with said piston and extending beyond one end of said cylinder for connection to a portion of a vehicle frame, a member sleeved in the opposite end of said cylinder, means closing one end of said sleeve and separating the same from the portion of the cylinder containing said piston, a movable spool element disposed in said sleeve member, means closing the opposite end of said sleeve member, means defining opposed and aligned apertures in said cylinder and sleeve member which are elongated longitudinally of said cylinder and sleeve member, a pinlike actuating member extending through said openings, a ball-like member sleeved on said pin member within said sleeve member and engaging one end of said valve spool, said ball-like member being free to move axially of said pinlike member a predetermined distance, slide members sleeved on said pinlike member and movably engaging said opening defining means so as to guide the movement of said pinlike member longitudinally of said cylinder and sleeve member, one end of said pinlike actuating member being connectable to a vehicle steering arm for actuation thereby, conduit means interconnecting the interior of said sleeve member with the portions of said cylinder on opposite sides of said piston, additional conduit means communicating with said sleeve member interior and connectable to a fluid pump and reservoir, and connector elements on said cylinder connectable to the steering linkage for vehicle ground engaging wheels.

3. In combination a vehicle including a chassis frame, ground engaging wheels, means connecting each wheel with said frame including a suspension arm, a steering knuckle carried by each suspension arm and connected with its adjacent wheel to permit said wheel to turn about a generally vertical axis, a steering knuckle arm connected with each steering knuckle, laterally extending rigid steering links connected with said steering knuckle arms and having their inner ends disposed in spaced apart relationship, a steering shaft actuatable by a steering wheel, a steering gear mechanism supported on said frame and operatively connected with said shaft, a steering arm connected with said steering gear mechanism and having a free end arcuately movable when said steering gear mechanism is actuated, a cylinder extending laterally of said vehicle adjacent said steering links, a bore-fitting piston within said cylinder, a piston rod connected to said piston and extending from one end only of said cylinder, means flexibly anchoring the free end of said piston rod to said chassis frame, spaced apart rigid connector elements connected with said cylinder and pivotally connected to the inner ends of said steering links to permit the inner ends of said links to gyrate relative to said connector elements and so that said cylinder forms a rigid link interconnecting said steering links and so that movement of said cylinder laterally of the vehicle will cause a turning movement of the ground engaging wheels in one direction or the other, a control valve including a movable valve element disposed in a portion of said cylinder separated and remote from said piston and piston rod, a pinlike element rigidly connected to said steering arm free end and extending into said cylinder and operatively connected with said movable valve element, means interconnecting said cylinder and said pinlike element substantially retaining said cylinder against rotation about its longitudinal axis but permitting limited relative movement between said cylinder and pinlike element in other directions without binding said valve element and so that movement of said steering arm will cause movement of said valve element, and conduit means communicating said control valve with said cylinder on opposite sides of said piston and connectible to a fluid pump and reservoir so as to provide hydraulic pressure to aid in steering the vehicle.

4. In combination a vehicle including a chassis frame, ground engaging wheels connected with said chassis frame, means connecting each of said ground engaging wheels with said frame to permit said wheels to turn relative to said frame, said means including a suspension arm, a steering knuckle carried by each suspension arm to permit the adjacent wheel to turn about generally vertical axes, a steering knuckle arm connected with each steering knuckle, laterally extending rigid steering links connected with said steering knuckle arms and having their inner ends disposed in spaced apart relationship, a steering shaft actuatable by a steering wheel, a cylinder extending laterally of said vehicle adjacent said steering links, a bore-fitting piston within said cylinder, a piston rod connected to said piston and extending from one end only of said cylinder, means flexibly anchoring the free end of said piston rod to said chassis frame, spaced apart rigid connector elements connected with said cylinder and pivotally connected to the inner ends of said steering links to permit the inner ends of said links to gyrate relative to said cylinder connector elements and so that said cylinder forms a rigid link interconnecting said steering links and so that movement of said cylinder laterally of the vehicle will cause a turning movement of the ground engaging wheels in one direction or the other, a control valve including a movable valve element, said steering shaft being operatively connected with said valve element so that movement thereof will cause movement of said valve element, means operatively connected between said steering shaft and said cylinder to substantially retain said cylinder against rotation about its longitudinal axis, but permitting limited movement of said cylinder in other directions, and conduit means communicating said control valve with said cylinder on opposite sides of the piston and connectible to a fluid pump and reservoir so as to provide hydraulic pressure to aid in steering the vehicle.

5. A power steering device for a vehicle having a steering wheel connected through suitable means with a swingable steering arm, as well as ground engaging wheels having steering linkage connected therewith; including an elongated cylinder, separated into two portions, a bore-fitting piston within one of said cylinder portions, a piston rod connected to said piston and extending beyond the adjacent end of said cylinder, flexible connector means on the projecting end of said piston rod for flexibly anchoring said rod to a vehicle frame to effect a universal connection therewith, rigid spaced apart pivotal connector elements connected with said cylinder and projecting generally transversely of the longitudinal axis thereof adapted to be pivotally connected with the steering linkage so that the linkage can gyrate relative to said connector elements, a control valve including a movable valve element disposed in the other portion of said cylinder, a pinlike element operatively connected with said movable valve element and projecting laterally from said cylinder for connection with a vehicle steering arm exteriorly of said cylinder, means interconnecting said pinlike element and said cylinder substantially retaining said cylinder against rotation about its longitudinal axis but permitting limited relative movement between said pinlike element and said cylinder so that said valve element can be actuated by said pinlike element, and conduit means communicating said control valve with said one cylinder portion on opposite sides of said piston and connectible to a fluid pump and reservoir.

6. A power steering device for a vehicle having a steering wheel and steering shaft as well as ground engaging wheels having steering linkage connected therewith; including an elongated cylinder separated into two portions, a bore-fitting piston within one of said cylinder portions, a piston rod connected to said piston and extending beyond the adjacent end of said cylinder, flexible connector means on the projecting end of said piston rod for flexibly anchoring said rod to a vehicle frame to effect a universal connection therewith, rigid spaced apart ball-like connector elements connected with said cylinder and projecting generally transversely of the longitudinal axis thereof and adapted to be pivotally connected with the steering linkage so that the linkage can gyrate relative to said connector elements, a control valve including a movable valve element disposed in the other portion of said cylinder, a member extending into said cylinder and operatively connected with said movable valve element, means on the projecting end of said member adapted to be connected with a vehicle steering shaft so that said valve element may be actuated by said steering shaft, means interconnecting said member and said cylinder and substantially retaining said cylinder against rotation about its longitudinal axis but permitting limited relative movement between said member and the said cylinder in other directions, and conduit means communicating said control valve with said one cylinder portion on opposite sides of said piston and connectible to a fluid pump and reservoir.

7. In a vehicle power steering device, an elongated sheet metal cylinder, at least one sleeve-like element inserted over and rigidly connected with said cylinder, a portion of a universal joint carried by said sleeve and projecting laterally of the longitudinal axis of the cylinder and adapted to be connected to a complemental joint portion in a vehicle steering linkage system, a bore-fitting piston disposed within said cylinder, a piston rod connected to said piston and projecting beyond one end of said cylinder, means carried by the projecting end of said rod for effecting a universal connection with a portion of the vehicle, means flexibly connected with the cylinder, adjacent the opposite end thereof and adapted to be connected with a steering shaft of a vehicle, a control valve including a movable valve element adapted to be operatively connected with the steering shaft of a vehicle for actuation, and conduit means communicating said control valve with said cylinder on opposite sides of the piston and connectible to a fluid pump and reservoir.

References Cited in the file of this patent

UNITED STATES PATENTS

| Number | Name | Date |
|---|---|---|
| Re. 17,146 | Gurney | Nov. 27, 1928 |
| 1,639,284 | Bragg et al. | Aug. 16, 1927 |
| 1,926,692 | Tarbox | Sept. 12, 1933 |
| 2,020,951 | Lemon | Nov. 12, 1935 |
| 2,022,698 | Vickers | Dec. 3, 1935 |
| 2,151,998 | Stelzer | Mar. 28, 1939 |
| 2,213,271 | Davis | Sept. 3, 1940 |
| 2,310,570 | Briggs | Feb. 9, 1943 |
| 2,334,918 | French | Nov. 23, 1943 |
| 2,427,340 | Allison | Sept. 16, 1947 |
| 2,487,618 | Twyman | Nov. 8, 1949 |
| 2,608,263 | Garrison | Aug. 26, 1952 |

FOREIGN PATENTS

| Number | Country | Date |
|---|---|---|
| 567,506 | Germany | Apr. 20, 1933 |
| 654,269 | Great Britain | June 13, 1951 |